United States Patent [19]
Norman

[11] Patent Number: 4,533,513
[45] Date of Patent: Aug. 6, 1985

[54] ENCLOSING MEANS FOR HOUSING A NUCLEAR REACTOR CORE

[75] Inventor: Hans Norman, Västerås, Sweden

[73] Assignee: AB Asea-Atom, Västerås, Sweden

[21] Appl. No.: 563,428

[22] Filed: Dec. 20, 1983

[30] Foreign Application Priority Data

Mar. 15, 1983 [SE] Sweden .................... 8301400

[51] Int. Cl.³ .................... G21C 13/06; F16J 13/00
[52] U.S. Cl. .................... 376/260; 376/263; 376/285; 376/294; 376/296; 52/21; 52/223 R; 52/223 L; 52/224
[58] Field of Search ............ 376/295, 296, 285, 260, 376/263, 294; 52/21, 223 R, 223 L, 224, 245

[56] References Cited

U.S. PATENT DOCUMENTS

| | | | |
|---|---|---|---|
| 3,072,554 | 1/1963 | Madsen | 376/263 |
| 3,196,082 | 7/1965 | Lemesle et al. | 376/269 |
| 3,293,139 | 12/1966 | Bellier | 376/296 |
| 3,349,524 | 10/1967 | Fistedis | 52/224 |
| 3,486,978 | 12/1969 | Lacriox et al. | 52/223 R |
| 3,568,384 | 3/1971 | Cruset et al. | 52/224 |
| 3,834,452 | 9/1974 | Costes | 376/295 |
| 3,893,270 | 7/1975 | Schupack . | |
| 4,032,402 | 6/1977 | Horner et al. | 376/295 |
| 4,195,457 | 4/1980 | Kissling et al. | 376/296 |
| 4,389,825 | 6/1983 | Chow | 52/224 |

FOREIGN PATENT DOCUMENTS

| | | | |
|---|---|---|---|
| 2157287 | 5/1972 | Fed. Rep. of Germany | 376/263 |
| 3003460 | 8/1980 | Fed. Rep. of Germany . | |
| 1538984 | 9/1968 | France . | |
| 1208600 | 10/1970 | United Kingdom | 376/296 |
| 1210890 | 11/1970 | United Kingdom | 376/296 |
| 2098786A | 11/1982 | United Kingdom . | |

OTHER PUBLICATIONS

Journal of British Nuclear Energy Soc., Band 13, No. 1, Jan. 1975. pp. 35-48, P. H. Margen, et al. "PCRVs for BWRs—a new dimension in LWR exploitation".
Nuclear Structural Engineering, Band 1, 1965, pp. 224-231, Chen Pang Tan; "Conceptual Design of a Prestressed Concrete Reactor Pressure Vessel".

Primary Examiner—Harvey E. Behrend
Assistant Examiner—Richard W. Wendtland
Attorney, Agent, or Firm—Pollock, Vande Sande & Priddy

[57] ABSTRACT

A concrete pressure vessel (1) for a nuclear reactor is formed with an arch (6) arranged above the cover (4) of the pressure vessel, said arch having a horizontally directed opening permitting horizontal transport of the cover. The cover (4) is retained by a plurality of compressive force transmitting elements (11) arranged between the cover and the arch (6).

5 Claims, 10 Drawing Figures

ENCLOSING MEANS FOR HOUSING A NUCLEAR REACTOR CORE

The present invention relates to an enclosing means for a nuclear reactor core. The enclosing means comprises an elongated concrete body and a pressure chamber within the concrete body. The pressure chamber is substantially defined by a surface of revolution corresponding to a longitudinal axis of revolution. The pressure chamber has an axially directed opening as well as a cover disposed at said opening for pressure-tight sealing of the pressure chamber.

More particularly, the invention relates to a concrete pressure vessel designed for a pressure of 20-120 bar and intended to accomodate equipment requiring maintenance. In such a pressure vessel of conventional design, the handling of the cover requires a great deal of work and is very time-consuming, among other things because of the great handling weight of the cover. This is true particularly if the concrete pressure vessel is intended to accomodate equipment which is so space demanding that the inlet opening has to be made with a relatively large cross-sectional area.

An enclosing means according to the invention is particularly intended for such cases where the pressure chamber is designed for the accomodation of a reactor core with associated heat exchangers and has an inner diameter of 8-16 m and an upwardly facing opening constituting at least 70% of the largest cross-section diameter of the pressure chamber.

In such cases a cover of steel or concrete—retained in a conventional manner—will have such a large weight that the handling is connected with very considerable inconveniences.

The task that is sought to be solved by the invention is to construct and arrange—in an enclosing means of the type described in the introduction—the means of attachment of the cover in such a way that, due to a particularly favourable distribution of the clamping forces, the cover can be dimensioned weaker and be made with considerably lower weight than with a corresponding conventional enclosing means, and in such a way that clamping members of a simple design and with a particularly short mounting and dismantling time can be used.

What characterizes the invention will become clear from the appended claims.

In the following the invention will be described with reference to the accompanying schematic drawings, wherein.

Figure 2:
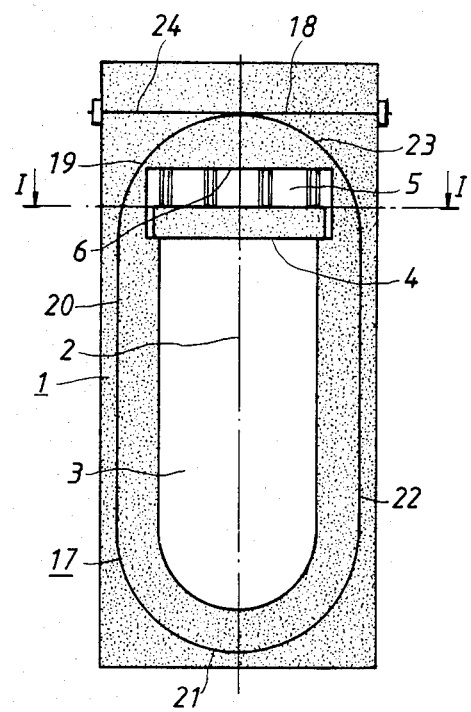
FIG. 2 shows an axial section along II—II of FIG. 1.

In the drawings, the numeral 1 designates a concrete body with a cavity which is formed substantially as a solid of revolution about a vertical axis of rotation 2. The cavity comprises two partial spaces, namely a pressure chamber 3, which can be sealed in a pressure-tight manner by means of a cover 4, and a partial space 5 axially outside the pressure chamber 3. The partial space 5 is limited in an axial direction by means of a substantially transversely extending limiting surface 6 which is made in the concrete body axially outside the cover 4.

The pressure chamber 3 has an upwardly facing circular opening which, along its periphery, is provided with a flat steel ring 7 which is attached to the concrete body 1. The steel ring 7 is provided with a sealing means which includes a hollow steel torus 8. The steel torus is slotted along its entire circumference in such a way that an annular gap is formed. One edge of the gap is welded to a steel ring 9 which is welded to the steel ring 7, whereas the other edge of the gap is welded to a metallic sealing ring 10 in such a way that—when the cover 4 is removed or relieved—a gap is formed between the sealing ring 10 and the steel ring 7. An annular sealing surface of the cover 4 is pressed against the sealing ring 10 by means of a plurality of compressive-force transmitting elements 11, which are arranged between the cover 4 and the above-mentioned limiting surface 6 provided in the concrete body 1. The cover 4 is made of pre-stressed concrete and formed with a lower, circular-cylindrical, solid portion, the axial dimension of which is designated C, and with an upper rectangular portion, the axial dimension of which is designated S. At the pressures and the pressure chamber volumes at which a structure according to the invention can suitably be applied, S is at least 30% greater than C, whereas C lies within the range 0.8-3 m. In the example, shown in the drawings the dimensions C and S are 2 m and 3.6 m, respectively. The upper rectangular portion of the cover 4 contains a cup-shaped, substantially circular-cylindrical space, which is divided into seven substantially parallel-epipedic, upwardly open spaces 12 by means of six vertical, mutually parallel force-transmitting walls 13. These walls are each provided with a door opening 14, which together with two outer doors 15 and 16 make the spaces 12 accessible to personnel.

Each force-transmitting wall 13 has a horizontally upwardly facing force-transmitting surface on which a plurality of force-transmitting elements 11 are evenly distributed. In addition, such elements are evenly arranged in a ring along the edge of the above-mentioned cup-shaped space. Each compressive-force transmitting element 11 simply consists of a solid or hollow steel body. Alternatively, each element 11 may comprise two threaded parts, whereby a correct axial dimension can be adjusted by screwing one part into the other, which can be made manually and/or by providing the elements 11 individually or in groups with remote-controlled drive members. When sealing the pressure chamber 3 by means of the cover 4, the force-transmitting elements 11 are unloaded or only very weakly loaded as long as no over-pressure prevails in the pressure chamber. Upon pressurizing the pressure chamber, the cover 4 can lift somewhat without any deteriorating effect on the sealing function of the sealing device consisting of the components 7, 8, 9, 10. Impermissible lifting of the cover 4 is prevented by the elements 11, whereby the total force transmitted by these elements to the transversal inner limiting surface 6 of the concrete body increases with increasing pressure in the pressure chamber 3. This force results in the concrete body 1 being loaded with great, axially directed tensile forces. In view of these forces, the concrete body 1 is provided with a plurality of elongated clamping loops 17, which are substantially arranged in parallel with an axial plane through the line IV—IV on FIG. 5. Each clamping loop 17 comprises a bundle of pre-stressed, loop-formed steel rods. The clamping loops 17 are each arranged in a correspondingly shaped channel in the concrete body 1, the channels being each provided with a metallic, thin-walled lining tube embedded in the concrete. Each clamping loop 17 comprises a first straight portion 18 arranged axially outside the limiting surface 6, said portion 18 extending transversally from an outer limiting surface in the concrete body 1 to an axial plane through the line IX—IX on FIG. 5, a second portion 19 connected to the portion 18 and approximately forming a circular arc of 90°, an axially running third portion 20 connected to said second portion, a semicircular fourth portion 21 connected to the portion 20, an axially running fifth portion 22 connected to said fourth portion, a sixth portion 23 connected to the portion 22 and approximately forming a circular arc of 90°, and, finally, a straight, transversally extending seventh portion 24 connected to the portion 23 and extending to an outer limiting surface of said concrete body.

Figure 5:
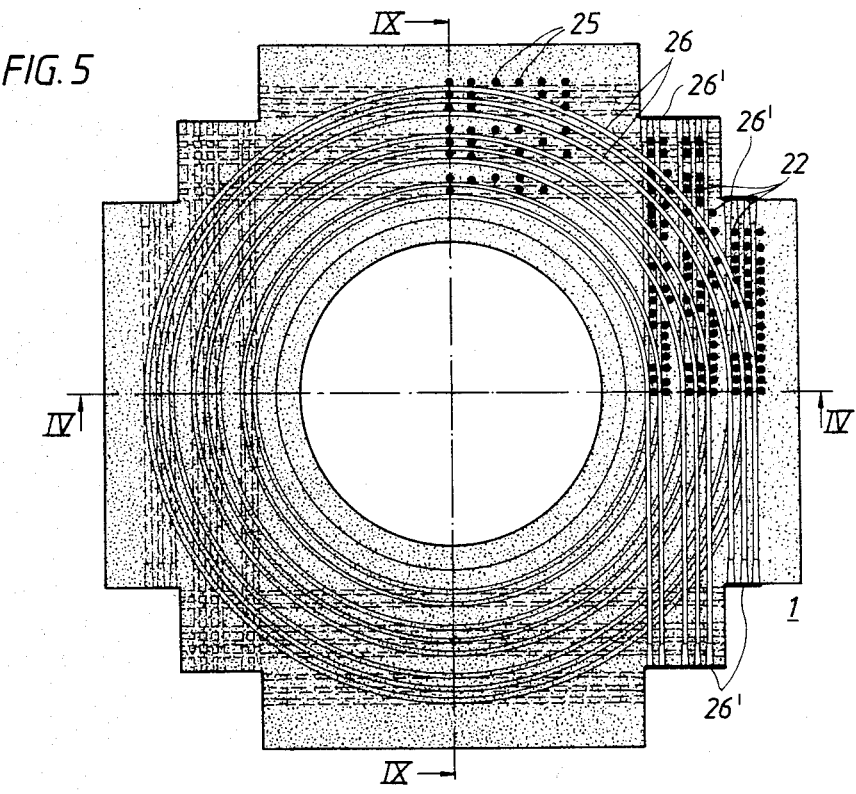
FIG. 5 shows a radial section along V—V of FIG. 4.
Figure 6:
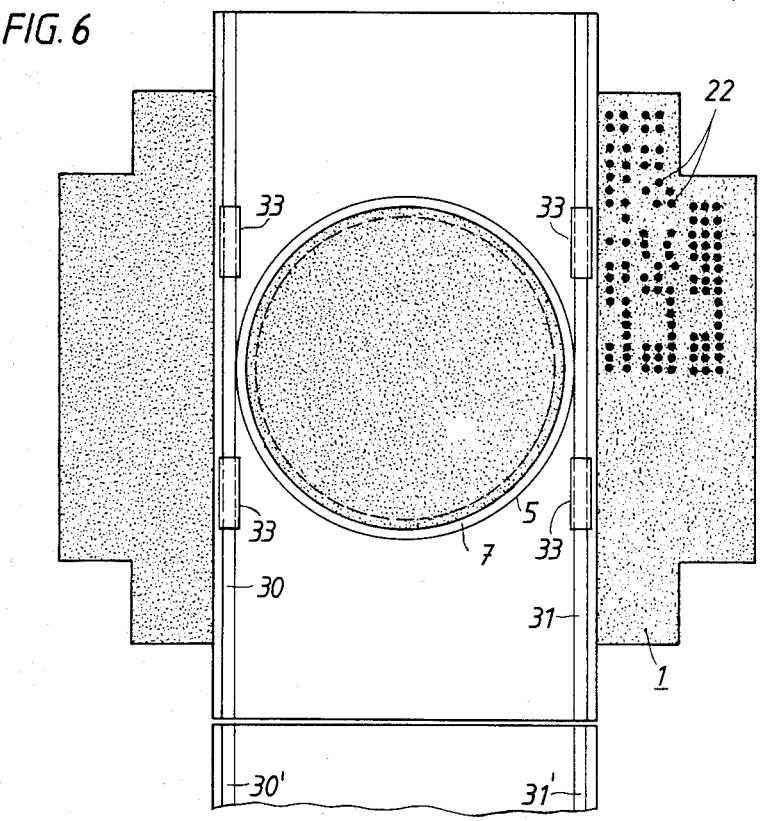
FIG. 6 shows a radial section along VI—VI of FIG. 4.
Figure 7:
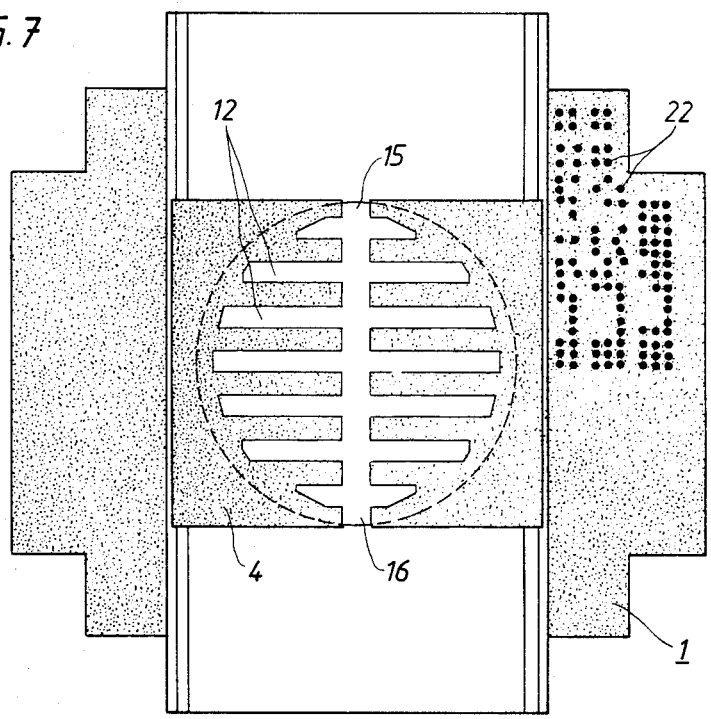
FIG. 7 shows a radial section along VII—VII of FIG. 4.

Further, the concrete body 1 comprises a plurality of U-shaped bundes 25 of U-shaped, pre-stressed steel yokes, each bundle being arranged in a U-shaped channel, each bundle 25 lying in a vertical plane which is parallel to an axial plane through the line IX—IX on FIG. 5.

In addition, the concrete body 1 includes a plurality of horizontal, substantially circular clamping loops 26, each of which comprises a bundle of pre-stressed, correspondingly formed steel loops. Each clamping loop 26 is arranged in a correspondingly formed channel arranged in the concrete body 1 and provided with a lining tube.

Stressing of the elongated clamping loops 17, the U-shaped bundles 25 and the circular clamping loops 26 does not take place until the concrete of the concrete body 1 has solidified and hardened for several weeks. The ends are then secured to metallic anchor plates 17' and 25' and 26', respectively, arranged at the outer limiting surfaces of the concrete body.

The partial space 5 is connected to two horizontal transport tunnels 27 for the cover 4, which are formed in the concrete body 1. Alternatively, the concrete body 1 can be formed with *one* such transport tunnel only. Each transport tunnel 27 is limited in the upward direction by a plane tunnel roof 28, which lies in the same horizontal plane as the above-mentioned horizontal limiting surface 6, and in the downward direction by a tunnel floor 29 which lies on a level with the upwardly facing surface of the plane steel ring 7. In the lateral direction, each transport tunnel 27 is limited by two confronting wall surfaces. The projections of these surfaces in the direction of the tunnel are linear and coincide mainly with the corresponding projections of the side walls 38 of the partial space 5.

Since the concrete body 1 immediately above the partial space 5 has a portion, whose outer horizontal dimension in a vertical plane along the line IX—IX is somewhat smaller than the corresponding horizontal dimension below the partial space 5, the extension of each tunnel floor 29 in the direction of the tunnel is somewhat greater than the corresponding extension of the roof and walls of the transport tunnel 27.

Figure 8:
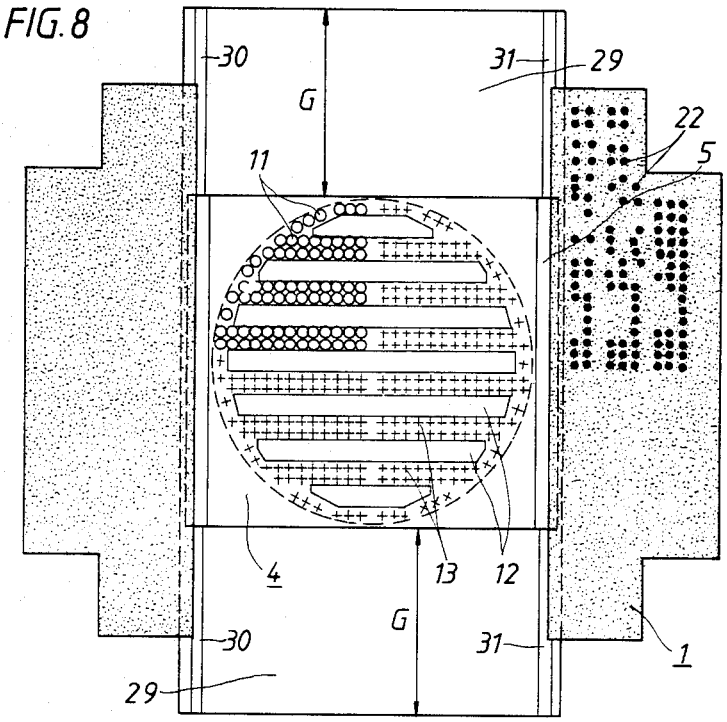
FIG. 8 shows a radial section along VIII—VIII of FIG. 4.
Figure 9:
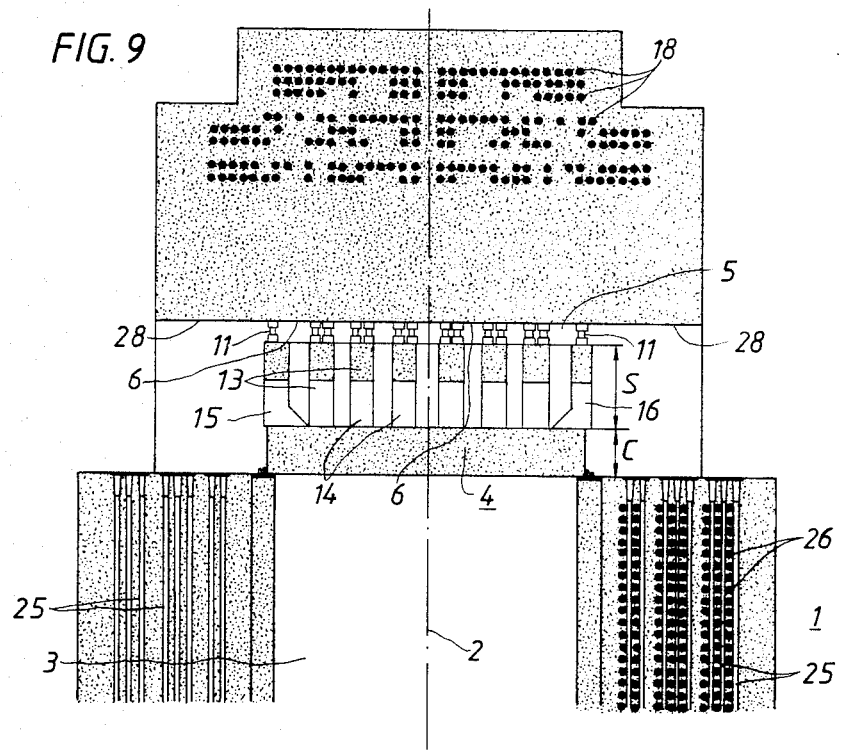
FIG. 9 shows an axial section along IX—IX of FIG. 5.

There is no distinct transition between the partial space 5 and the transport tunnels 27. In the following each tunnel 27 is regarded as extending from a vertical plane through the nearest vertical surface of the cover 4, which means that the dimensions G on FIG. 8 indicate the horizontal dimension of each tunnel floor 29.

Two straight transport rails of steel, 30 and 31, are recessed in a horizontal, upwardly directed concrete surface which comprises the two tunnel floors 29 and a lower horizontal limiting surface for the partial space 5. The cover 4 is provided with four wheel stands 33 which are evenly distributed on the two transport rails 30 and 31. Each wheel stand 33 comprises a plurality of wheels 34, which are arranged to be able to roll on the corresponding transport rail. In each wheel stand 33 the wheels 34 are arranged with their wheel axles fixed to a body 35 having U-shaped cross-section, which body is guided by means of vertically directed guiding means provided in the wheel stand 33. The body 35 is mechanically connected to the pistons of a plurality of hydraulic cylinders 36, which are fixed to the cover 4.

Figure 3:
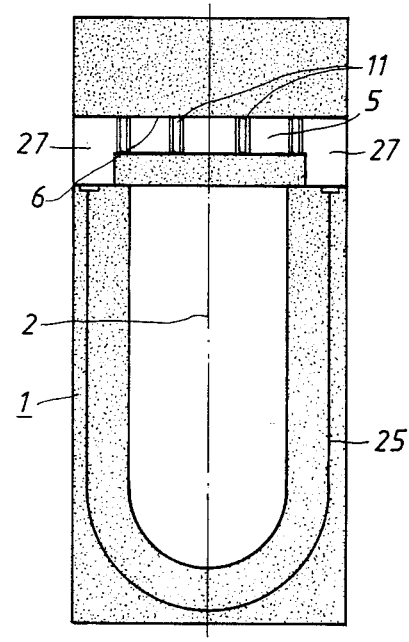
FIG. 3 shows an axial section along III—III of FIG. 1.
Figure 1:
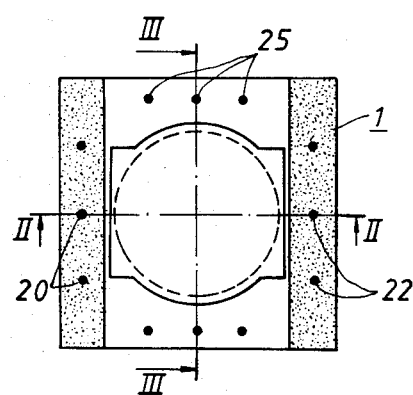
FIG. 1 is a simplified representation of the principle of an enclosing means according to the invention in radial section along I—I of FIG. 2.
Figure 4A:
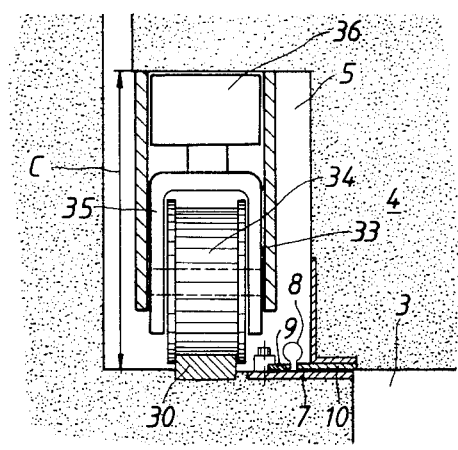
FIG. 4A shows on an enlarged scale a part of FIG. 4.
Figure 4:
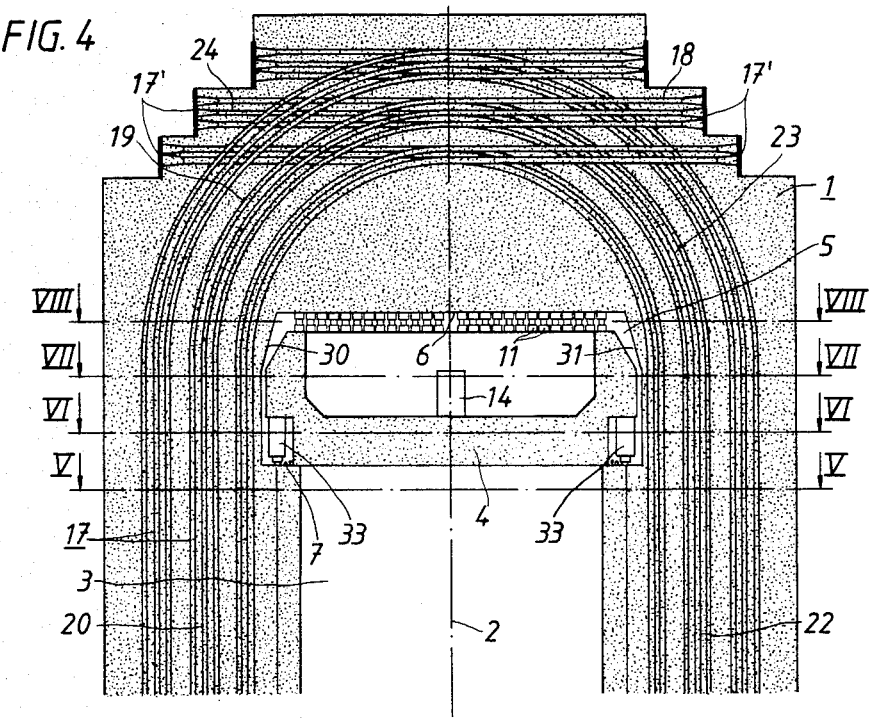
FIG. 4 is a relatively detailed representation of the enclosing means shown in FIGS. 1, 2, 3 in partial axial section along II—II of FIG. 1, and along IV—IV of FIG. 5.

The pressure chamber 3 contains a nuclear reactor core 39 as illustrated diagrammatically in FIGS. 2 and 3 of the drawings, and is provided with a plurality of conduits (not shown in the drawings) for steam and/or fluid introduced from the outside of the concrete body 1.

When the cover 4 is to be removed, the pressure in the pressure chamber 3 is first reduced, whereafter the compressive-force transmitting elements 11 are removed or adjusted to reduced axial dimension. Thereafter the pressure in the hydraulic cylinders 36 is increased to such an extent that a gap arises between the sealing ring 10 and the corresponding sealing surface in the cover 4, whereupon a horizontal force is applied on the cover 4. Thereby the wheels 30 roll on the rails 30 and 31, and the cover is removed through one of the two transport tunnels 27 and to a transport track arranged outside the concrete body.

The transport track has two outer transport rails 30' and 31', which are arranged in alignment with the transport rails 30 and 31, respectively.

An enclosing means according to the invention is especially well fitted to be used as a pressure vessel in a nuclear reactor of the type disclosed in U.K. patent application GB No. 2098786 A.

The means described above is only *one* of a number of feasible embodiments of the invention. Thus, it is also possible—to a larger or smaller extent—to replace the described clamping loops arranged in channels by reinforcement bars, which in pre-stressed condition are cast into the concrete body 1. Further, the wheels 34 can be replaced by a number of sliding feet.

I claim:

1. In a water cooled nuclear reactor having a core and an enclosing means housing said core, said enclosing means comprising an elongated concrete body and a pressure chamber within said concrete body, said pressure chamber being substantially defined by a solid of revolution about a vertical, longitudinal axis of rotation, said pressure chamber having an opening directed to the axial direction and a cover arranged at said opening so as to give a pressure-tight sealing of said pressure chamber, said pressure chamber constituting only part of a larger cavity within said concrete body, said cavity in addition to said pressure chamber comprising a space located above said opening and connected with the outside of said concrete body by means of at least one transversal tunnel provided in said concrete body, said enclosing means being further characterized in that said space is defined in an upwards direction by means of a transversely extending limiting surface belonging to an integral portion of said concrete body, in that most of said limiting surface is disposed vertically above said cover, in that a gap extends vertically between said limiting surface and said cover, in that a plurality of compressive-force transmitting elements are arranged so as to bridge said gap, in that said cover is arranged relative to said space and dimensioned so as to be removable from said opening for maintenance of equipment associated with said core, and in that said at least one tunnel is dimensioned to permit transport of said cover through said tunnel upon removal of said cover from said opening.

2. Enclosing means according to claim 1 which further includes means for transporting said cover through said transversal tunnel.

3. Enclosing means as claimed in claim 1, wherein said concrete body comprises a plurality of pre-stressed loops of metallic material arranged in the concrete and completely surrounding said cavity, each of said loops substantially lying in a corresponding axial plane.

4. Enclosing means as claimed in claim 3, wherein each one of said loops comprises a first straight portion arranged axially outside said limiting surface, said first portion extending transversely from an outer limiting surface of said concrete body to an imaginary axial plane oriented perpendicularly to said first portion, a second portion connected to said first portion which approximately forms a circular arc of 90°, an axially extending third portion connected to said second portion, a semicircular fourth portion connected to said third portion (20), an axially extending fifth portion connected to said fourth portion, a sixth portion connected to said fifth portion and arranged along a circular arc of approximately 90°, and a straight transversely extending seventh portion connected to said sixth portion and extending to an outer limiting surface of said concrete body.

5. Enclosing means as claimed in claim 3, wherein said loops are each arranged in a loop-formed channel cast in said concrete body.

* * * * *